TWO-LEVEL QUANTIZATION SYSTEM

Filed Jan. 24, 1962

INVENTOR.
FRANCIS P. KEIPER, JR.
BY
Fordyce A. Bothwell
ATTORNEY

United States Patent Office 3,196,208
Patented July 20, 1965

3,196,208
TWO-LEVEL QUANTIZATION SYSTEM

Francis P. Keiper, Jr., Oreland, Pa., assignor to Philco Corporation, Philadelphia, Pa., a corporation of Delaware Filed Jan. 24, 1962, Ser. No. 168,366
4 Claims. (Cl. 178—7.2)

Figure 1:
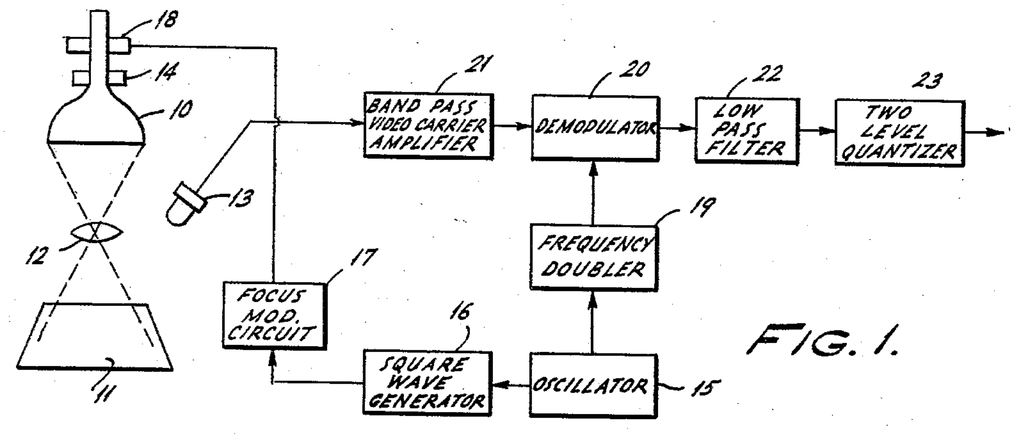

This invention relates to the production of a two-level quantized signal representative of a monochrome (black and white) picture or image, in which signal the two-level quantization is representative of black and white.

The invention is applicable, for example, to character reading, i.e. recognition of information poorly displayed as in a document such as a photograph, the details of which are not easily discernible. In a character reading system, a signal is produced which is representative of the information to be "read," and in some such systems the signal is quantized to two levels, representing black and white, before the signal is further processed.

As is well known, a monochrome picture or image signal may be produced by scanning the picture or image in successive lines. While two-level quantization of the picture information is sometimes desirable, when a picture is simply line scanned and the picture signal thus produced is quantized to two levels, the resulting signal may not be entirely satisfactory in some instances.

In a copending application of J. S. Bryan et al., Serial No. 104,664, filed April 21, 1961, there is disclosed and claimed a two-level quantization system which utilizes second spatial derivatives of brightness of a scanned picture or image. In that system a signal is produced which is represented substantially by the expression $$\frac{d^2B}{dx^2}+\frac{d^2B}{dy^2}$$

where B is brightness, $x$ is the direction of line scan, and $y$ is a direction transverse to the line scanning direction. This signal is supplied to a two-level quantizer.

The reason why this signal is ideally suited for optimum two-level quantization may be explained as follows. Where there is a transition in brightness of a picture or image between areas of different brightness, the second spatial derivative of brightness peaks in opposite directions and the point at which it changes sign corresponds to the point of inflection of the brightness transition. It can therefore be used to actuate a two-level quantizer such as a flip-flop circuit. Since brightness transitions may be encountered in any direction in a small area of the picture or image, the sum of the second spatial derivatives of brightness in two directions depicts the said area. For example, employing a time derivative of brightness, if a sharply focused beam were scanning closely parallel to a transition, it would not sense such transition but if the beam were caused to scan across the transition, it would then sense the transition.

As set forth in the above-mentioned copending application, the desired signal may be derived by employing beam focus modulation as heretofore proposed for use in television aperture correction by Schroeder and Gibson (Journal of the Society of Motion Picture and Television Engineers, vol. 64, December 1955, pages 660–670). By modulating the beam focus at a frequency which is substantially higher than the line scanning frequency, the beam is rapidly and repeatedly enlarged so that it senses any adjacent transitions. It has been found however that the use of sine wave modulation of the beam focus in a two-level quantization system has some disadvantages.

The principal object of the present invention is to provide improved focus modulation in such a system.

In accordance with this invention the focus modulation is effected by means of a symmetrical waveform which causes the beam to be in focus during a substantial portion of each focus modulation cycle, preferably during about 50% of the modulation cycle. This yields better signal-to-noise ratio than is possible by the use of sine wave focus modulation.

Figure 2:
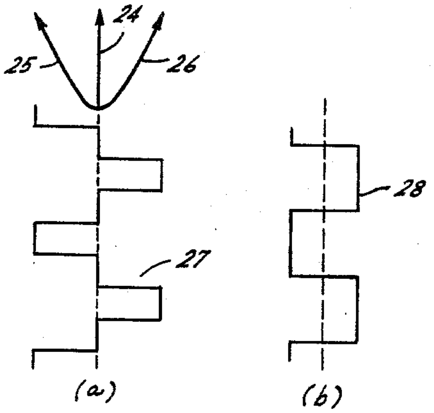
Figure 3:
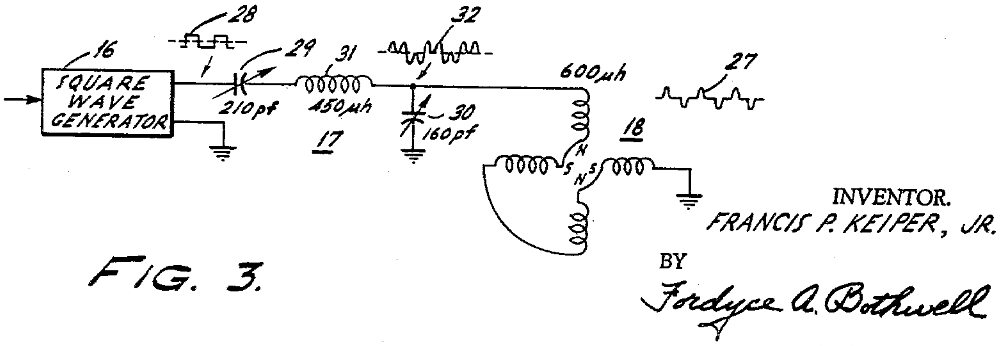

The invention may be fully understood from the following detailed description with reference to the accompanying drawing wherein FIG. 1 is a block diagram of a system embodying the present invention;

FIG. 2 illustrates the beam focus modulation provided in accordance with this invention; and FIG. 3 is a schematic illustration of a circuit which may be employed to produce the focus modulation waveform in accordance with this invention.

Referring to FIG. 1 there is shown by way of example a character reading system which is simliar to that disclosed in the above-mentioned copending application but which embodies the present invention. In this system a flying spot scanner 10 serves to effect light beam scanning of a picture or image 11 through the medium of a lens 12, and the reflected light activates a phototube 13, e.g. a photomultiplier, to produce the video carrier signal. As in one form of aperture correction system described in the above-mentioned publication, concurrently with the line scanning deflection of the electron beam in scanner 10 by the usual deflection yoke 14 the beam is subjected to focus modulation derived from a sine wave oscillator 15. In accordance with this invention however the focus modulation is effected by a special waveform which is produced by square wave generator 16, focus modulation circuit 17 and yoke 18 as hereinafter described.

The output of oscillator 15 is also supplied to a frequency doubler 19 and thence to demodulator 20, to which the video carrier signal is also supplied via band pass amplifier 21. The output of demodulator 20 is the second spatial derivative signal which, as previously stated, is ideally suited for two-level quantization. This signal is supplied via low pass filter 22 to the two-level quantizer 23 whihc may be a bistable or flip-flop circuit and which is actuated by excursions of the signal representative of transitions between black and white.

The signal thus supplied to the two-level quantizer and represented substantially by the expression $$\frac{d^2B}{dx^2}+\frac{d^2B}{dy^2}$$

contains the picture information since it represents the rates of change of brightness changes in all directions. Moreover this signal accurately indicates points of inflection of the brightness changes, and it optimizes the two-level quantization.

Referring now to FIG. 2, illustration (*a*) shows the focus modulation wave which is produced in accordance with this invention, and illustration (*b*) shows a square wave signal which is utilized to produce the focus modulation wave. In illustration (*a*) axis 24 represents the in-focus condition of the beam, while the enlargement of the beam by the focus modulation wave 27 is represented at 25 and 26. The axial portions of the focus modulation wave 27 which are aligned with zero axis 24 represent the in-focus condition, while the excursions from the wave axis produce the de-focus condition. Wave 27 may be produced from the square wave signal 28 by means of the circuit shown in FIG. 3 to which reference is now made.

The square wave generator 16 may be of any conventional form suitable for producing the square wave signal 28. The circuit connected to said generator comprises variable capacitor 29 and 30, inductor 31, and the quadripole focus modulation yoke 18, connected as shown. Exemplary values of the elements are indicated for use with a 300 kc. square wave generator supplied with a 300 kc. sine wave from oscillator 15. In operation the generator 16 produces the square wave signal 28 which is converted to the wave form 32 and the latter in turn is converted to the wave 27. The circuit is a two pole network, with poles at the fundamental and third harmonic of the input frequency, which inverts the third harmonic phase to yield approximately the wave form of FIG. 2(*a*) from that of FIG. 2(*b*).

It will be seen that wave 27 has axial portions and intermittently-occurring excursions from the wave axis, and in the preferred form illustrated the excursions occur during approximately one-half of the time of each cycle of the wave. Thus the beam is in focus approximately 50% of the time.

While a preferred embodiment of the invention has been illustrated and described, it will be understood that the invention is not limited thereto but contemplates such modifications and further embodiments as may occur to those skilled in the art.

I claim:

1. In a system for producing a picture or image representative signal quantized to two levels representing black and white, means for causing an electron beam to scan the picture or image in successive lines, means for producing a wave having a frequency substantially higher than the line-scanning frequency and having axial portions and intermittently-occurring excursions from the wave axis, said excursions occurring during a predetermined fraction of the time of each cycle of said wave, means for utilizing said wave to effect focus modulation of said beam, means for producing from the beam scanning and focus modulation a signal represented substantially by the sum of the second spatial derivatives of brightness of the picture or image in two directions, and means responsive to said last-named signal to provide a two-level signal whose levels respectively represent black and white areas of the picture or image.

2. In a system for producing a picture or image representative signal quantized to two levels representing black and white, means for causing an electron beam to scan the picture or image in successive lines, means for producing a wave having a frequency substantially higher than the line-scanning frequency and having axial portions and intermittently-occurring excursions from the wave axis, said excursions occurring during approximately one-half of the time of each cycle of said wave, means for utilizing said wave to effect focus modulation of said beam, means for producing from the beam scanning and focus modulation a signal represented substantially by the sum of the second spatial derivatives of brightness of the picture or image in two directions, and means responsive to said last-named signal to provide a two-level signal whose levels respectively represent black and white areas of the picture or image.

3. In a system for producing a picture or image representative signal quantized to two levels representing black and white, means for causing an electron beam to scan the picture or image in successive lines, means for producing a wave having a frequency substantially higher than the line-scanning frequency and having axial portions and intermittently-occurring excursions from the wave axis, said excursions occurring during a predetermined fraction of the time of each cycle of said wave, means for utilizing said wave to effect focus modulation of said beam, means for producing from the beam scanning and focus modulation a signal represented substantially by the expression $$\frac{d^2B}{dx^2}+\frac{d^2B}{dy^2}$$

where B is brightness, $x$ is the direction of line scanning of the picture or image, and $y$ is a direction transverse to the line scanning direction, and means responsive to said last-named signal to provide a two-level signal whose levels respectively represent black and white areas of the picture or image.

4. In a system for producing a picture or image representative signal quantized to two levels representing black and white, means for causing an electron beam to scan the picture or image in successive lines, means for producing a wave having a frequency substantially higher than the line-scanning frequency and having axial portions and intermittently-occurring excursions from the wave axis, said excursions occurring during approximately one-half of the time of each cycle of said wave, means for utilizing said wave to effect focus modulation of said beam, means for producing from the beam scanning and focus modulation a signal represented substantially by the expression $$\frac{d^2B}{dx^2}+\frac{d^2B}{dy^2}$$

wherein B is brightness, $x$ is the direction of line scanning of the picture or image, and $y$ is a direction transverse to the line scanning direction, and means responsive to said last-named signal to provide a two-level signal whose levels respectively represent black and white areas of the picture or image.

References Cited by the Examiner

UNITED STATES PATENTS

| | | | |
|---|---|---|---|
| 2,902,540 | 9/59 | Sarson | 178—6.8 |
| 2,916,549 | 12/59 | Schreiber | 178—7.5 |

FOREIGN PATENTS

| | | |
|---|---|---|
| 215,430 | 8/56 | Australia. |

DAVID G. REDINBAUGH, *Primary Examiner.*

ROBERT SEGAL, *Examiner.*